United States Patent [19]

Chavarria et al.

[11] 4,116,439
[45] Sep. 26, 1978

[54] POOL BALL

[75] Inventors: Robert James Chavarria, Fountain Valley, Calif.; Clark Berg Foster, Seattle, Wash.

[73] Assignee: C.F.F. Inc., Bloomington, Calif.

[21] Appl. No.: 728,498

[22] Filed: Sep. 30, 1976

[51] Int. Cl.² .................. A63B 37/04; A63B 37/12
[52] U.S. Cl. ............................. 273/59 A; 273/59 B; 40/327; 264/245; 264/299
[58] Field of Search ............. 273/63 C, 63 G, 59 R, 273/63 E, 59 B, 59 A; 40/327

[56] References Cited

U.S. PATENT DOCUMENTS

| 507,880 | 10/1893 | Burt | 40/327 |
|---|---|---|---|
| 697,925 | 4/1902 | Kempshall | 273/59 R |
| 3,202,742 | 8/1965 | Bachelder et al. | 273/63 G |
| 3,207,514 | 9/1965 | Vickery | 273/63 C |
| 3,228,686 | 1/1966 | Faulkner | 273/59 R |
| 3,270,108 | 8/1966 | Randolph | 273/63 G X |
| 3,318,727 | 5/1967 | Boenig et al. | 273/63 G X |

*Primary Examiner*—George J. Marlo
*Attorney, Agent, or Firm*—Ralph B. Pastoriza

[57] ABSTRACT

A transparent game ball particularly useful as a billiard or pool ball is disclosed, along with manufacturing processes and apparatus for producing the ball. The ball includes a weighted opaque object centered within the transparent spherical outer covering of the ball for providing the required weight for the ball as well as a desirable appearance. The transparent portion of the ball is produced bubble free of polyester resin through the use of a special, two-piece mold for forming the entire ball at one time. Into this two-piece mold a centering spider or disk of the same rigid polyester resin is inserted. The spider or disk may be either transparent or opaque, and is used to precisely center the opaque weighted object at the ball's geometric center.

1 Claim, 11 Drawing Figures

POOL BALL

BACKGROUND OF THE INVENTION

The present invention relates to game balls, and more specifically to balls used on the games of pool and billiards.

Prior to the present invention, pool and billiard balls have become somewhat standardized both as to surface hardness and finish and as to diameter and weight. Within the constraints of these standards, it has heretofore been impossible to manufacture transparent balls for use in these games which would withstand the required impact with other balls, have a pleasant appearance, be properly weighted and have a center of gravity precisely centered at the ball's geometric center for providing uniform rolling characteristics for the ball in all directions. One of the most severe limitations in the prior art in regard to producing such a ball has been the inability of the prior art to provide a mold for properly molding the entire sphere of such a ball, and a proper centering mechanism for assuring that a weighted object could be precisely located at the geometric center of the ball within such a mold used for thermosetting resin. Since balls of this type are generally ground and polished to a near perfect spherical shape after initial molding, it is important that the ball, before grinding, be formed as nearly spherical as possible, so that the grinding operation will uniformly grind the entire outer surface of the sphere, leaving the weighted object at the geometric center of this sphere.

The prior art has not provided a method for precisely centering a weighted object within such a spherical ball, but rather has typically relied upon the use of materials of uniform density to avoid any possibility of eccentric weighting within the ball.

These constraints therefore have led to the inability of the prior art to provide a transparent game ball with a weighted, precisely centered, opaque center.

SUMMARY OF THE INVENTION

The present invention discloses a mold structure for precisely centering a weighted object within a spider or disk structure formed of rigid polyester resin. The present invention also provides a unique mold for receiving the spider or disk structure in a manner which precisely centers the weighted object within this second mold, this mold being spherical in shape and permitting the formation of a transparent, spherical ball from polyester resin about the previously cured spider or disk structure. The result of the forming process using these molds is a transparent ball having a weighted, geometrically centered, opaque object, the ball being extremely interesting in appearance while having all of the play characteristics of a standard billiard or pool ball. It has been found that, using the techniques of this invention and the mold apparatus, virtually any opaque may be placed at the center of the transparent sphere, so that the ball may have particular use, for example, for advertising promotion of products or simply for providing game balls having a distinctive appearance.

These and other advantages of the present invention are best understood through the following detailed description which references the drawings in which.

DETAILED DESCRIPTION OF THE PREFERRED EMBODIMENT

Figure 1:
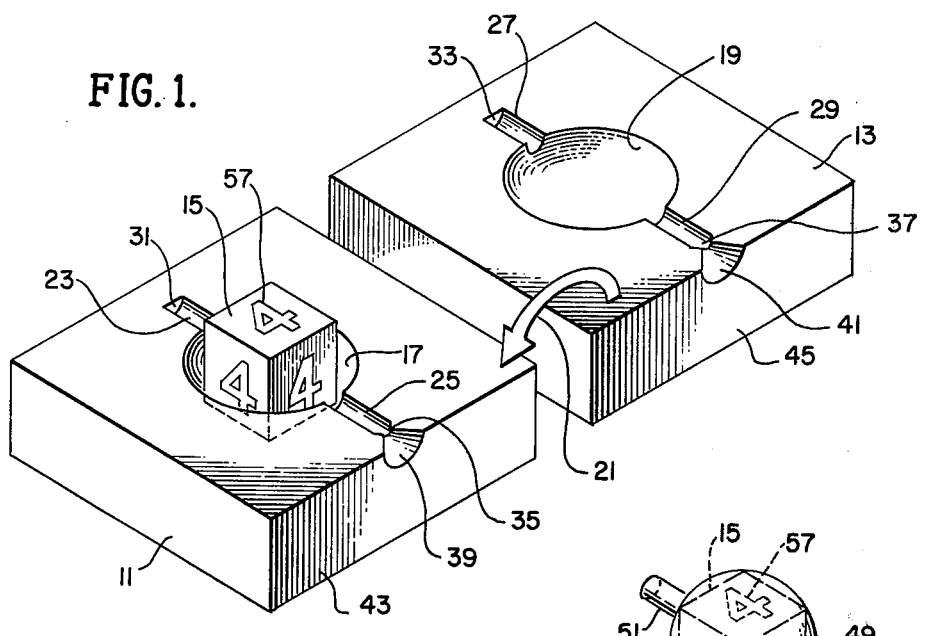
FIG. 1 is a perspective exploded view of a preliminary mold used for forming a spider insert surrounding a solid opaque object.
Figure 2:
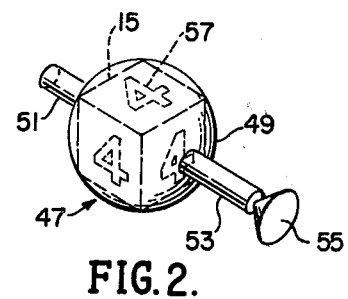
FIG. 2 is a perspective view of the spider insert after its removal from the mold of FIG. 1.

Referring initially to FIGS. 1 and 2, a preliminary mold, including first and second mold halves 11 and 13, is used for surrounding an opaque object 15 with a spider insert which is ultimately used for centering the opaque object 15 precisely at the geometric center of the spherical ball to be ultimately produced.

The molds 11 and 13 each include a hemispherical, conforming major recess 17 and 19, respectively, which recesses form a spherical cavity when the molds 11 and 13 are positioned face-to-face, as shown by the arrow 21. The diameter of the hemispherical recesses 17,19 is selected to be precisely equal to the major diagonal dimensions of the opaque cube 15. This cube 15 may be formed, for example, of metal which has a higher specific gravity than the pool ball to be ultimately produced as well as a higher specific gravity than the material to be formed in the mold halves 11,13.

The mold half 11 includes a pair of spider forming recesses 23 and 25, each formed as a half cylinder and eminating from diametrically opposed locations on the hemispherical recess 17. The mold half 13 includes a similar pair of spider forming recesses 27 and 29 positioned at diametrically opposed locations on the spherical recess 19. It will be appreciated that the recesses 23 and 27 as well as the recesses 25 and 29 each form cylindrical cavities when the mold halves 11 and 13 are positioned face-to-face as shown by the arrow 21. The recesses 23 and 27 each include a semi-circular end wall 31,33, respectively, opposite the opening of the recesses 23 and 27 into the spherical recesses 17,19. The recesses 25 and 29 include a similar semi-circular end wall 35 and 37, respectively, except that the end walls 35,37 communicate with the small extremity of fill openings 39 and 41 which, when juxtaposed, form a conical or funnel-shaped opening into the main valve cavity. The openings 39 and 41 communicate with the upper faces 43 and 45 of the mold halves 11 and 13, respectively. The semi-circular opening between the recess 25 and 39 in the mold 11, as well as the opening between the recesses 29 and 41 of the mold 13, should be maintained as small as possible to facilitate breaking away of the excess material which hardens within the funnel-shaped recesses 39 and 41 in the production of the spider member.

Since the cube 15 is dimensioned so that its major diagonals are precisely identical to the spherical recess of the mold 11,13, when the mold 11,13 is positioned face-to-face as shown by the arrow 21 surrounding the cube 15, the corners of the cube 15 will each bear against the spherical recess 17,19, precisely positioning the cube 15 within the mold 11, 13 regardless of the orientation of the cube 15. Since the cube 15 is a regular geometrical object, its orientation within the mold 11, 13 during this preliminary molding process, is not critical.

After the mold halves 11,13 have been positioned face-to-face, polyester resin in its uncured state may be mixed with a catalyst and the mixture may be injected into the mold 11,13 through the funnel-shaped opening 39,41 to completely fill the recesses 17, 19, 23, 25, 27, and 29. Some excess resin will also fill a portion of the funnel-shaped opening 39,41. The catalyst will produce a hardening of the polyester resin so that, after a period of time, the mold halves 11,13 may be separated to permit removal of the spider-encapsulated cube 47 shown in FIG. 2. This element includes the cube 15, a spherical polyester resin member 49 surrounding the cube 15, and a pair of cylindrical spider extensions 51 and 52, the extension 53 including a frustoconical further extension 55. This extension 55 may be easily broken away from the extension 53 if the intervening circular connection has a sufficiently small cross-sectional area.

The mold 11,13 is formed such that the length of the cylindrical spider extensions 51 and 53 have precisely the same length. This identical length is selected such that the overall length of the spider element 37 is slightly greater than that of the ball ultimately formed, and just equal to the distance between receptacles formed in the final mold and explained in detail below.

Additional spider arms extending from the spherical member 49 in different directions from the extensions 51 and 53 may be provided if additional positioning reliability is required in the final mold form, although it has been found that, with the molds described in this application, the pair of extensions 51 and 53 is sufficient for precisely centering the opaque cube 15 at the geometric center of the pool ball ultimately formed.

As shown in FIGS. 1 and 2, the opaque cube 15 may be inscribed with numerals 57 to provide numbering for pool balls if desired.

The polyester resin which has been found particularly satisfactory for forming the ball of the present invention is sold under the trade name "Clear-Cast" by Fiberlay, Inc. of Seattle, Wash. This resin is combined with P-102 catalyst also supplied by Fiberlay, Inc. prior to injection in the mold form. Since Clear-Cast polyester resin is somewhat tacky when cured, a material sold under the trade name "Surface Seal" by Fiberlay, Inc. may be added to the mixture to provide a tack-free surface. This is much more important in the ultimate casting of the sphere for the ball than in the casting for the spider insert, since a tacky surface on the spider insert will assure a good bond between the spider insert and the sphere of the ultimate ball.

It is extremely important in the production of a transparent pool ball to avoid any bubbles within the polyester resin. This is accomplished by starting with settled resin having no bubbles. The resin is transferred to a container with no sharp corners that can trap bubbles and catalyst, Surface Seal and reducer, if desired, are added, preferably below the surface of the resin using a calibrated syringe. Mixing must then proceed carefully, utilizing an agitator which does not rise above the surface of the resin and moves relatively slowly. The resin must then be poured very slowly into the mold form to avoid the production of bubbles. It has been found advantageous to use acetone to thin or reduce the resin, thereby reducing its viscosity to permit small bubbles to more readily rise to the surface and exit from the mold form. In this regard, one part of acetone may be added to 20 parts of resin for thinning purposes. It is then found necessary to add 50% more catalyst than is normally required for a specified cure time for the resin, since the acetone has been found to slow the curing process. It has also been found helpful, in avoiding separation between the resin and the opaque insert, to coat the insert with clear polyester resin or clear lacquer prior to insertion in the preliminary mold 11,13.

Figure 3:
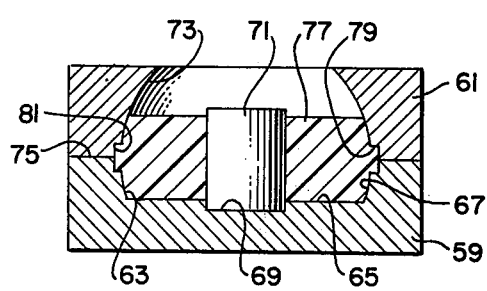
FIG. 3 is a sectional view of an alternate preliminary mold used for forming disk-shaped inserts surrounding opaque objects.
Figure 4:
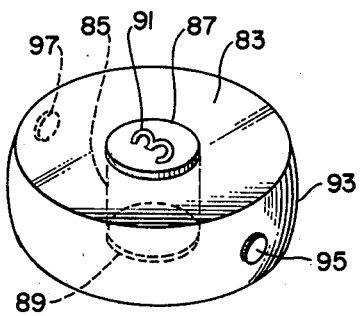
FIG. 4 is a perspective view of the disk-shaped preliminary molded article after removal from the mold of FIG. 3.

Referring now to FIGS. 3 and 4, an alternate preliminary mold form used for assuring the accurate geometric centering of a weighted object will be described. In this instance, the mold includes a lower half 59 and upper half 61. The lower mold form 59 includes a recess 63 having a flat bottom wall 65 and a spherical segment side wall 67. The flat bottom wall 65 may advantageously include a centrally located, cylindrical, shallow recess 69 for permitting the precise location of a cylindrical weight 71 having a specific gravity which is higher than the polyester resin used to form the ball and higher than the specific gravity of the ultimate composite ball. The diameter of the spherical wall segment 67 is precisely identical to the diameter of the ultimate pool ball to be formed by the successive molding process.

The upper mold form 61 includes a spherical segment recess 73 having a diameter equal to the spherical segment wall 67, so that when the mold halves 59 and 61 are positioned face-to-face as shown in FIG. 3 the walls 67 and 73 form a mating spherical segment recess. These spherical segment walls 67,73 are formed such that the plane of the mating interface 75 of the mold halves 59 and 61 passes through the center of the sphere of which the walls 67 and 73 are segments.

The cylindrical weighted object 71 may, if desired, be opaque, and has a diameter which is identical to the diameter of the cylindrical recess 69 so that the cylinder 71 may be positioned into the recess 69 for accurate location during the molding process. In addition, the distance between the bottom wall of the cylindrical recess 69 and the plane 75 is selected to be precisely one-half the height of the cylindrical object 71, so that when placed in the in the cylindrical recess 69 of the geometric center as well as the center of gravity of the object 71 will be precisely located at the center of the sphere of which the spherical segment walls 67 and 73 form a segment.

If the polyester resin used for this initial molding process in the mold of FIG. 3 has a specific gravity which is identical to the polyester resin used to fill the final mold form, the height to which the polyester resin 77 fills the mold 59,61 is not critical, although it should fill the mold sufficiently to form a substantial spherical wall segment for accurate placement within the final mold.

If desired, the mold halves 59,61 may include recesses which, when combined, form shallow cylindrical recesses 79 and 81 at diametrically opposed locations on the spherical segment wall 67,73, preferably positioned with their axes coincident with the plane 75.

Polyester resin, such as that described in reference to the material used to fill the mold of FIG. 1, is poured slowly into the mold of FIG. 3 as shown at 77 and allowed to cure. The mold halves 59 and 61 are then separated and the cured object of FIG. 4 is removed. This object includes a flat, disk-like, transparent polyester member 83 surrounding a cylindrical, weighted object 85 to provide a disc-shaped assembly. Object 85 may, if desired, include disk-shaped members 87 and 89 at opposite ends of the cylinder 85 to provide numeral identification 91 for the ball to be ultimately formed. The disk-shaped member 83 includes spherical segment wall 93 having a pair of short, cylindrical extensions 95 and 97 extending at diametrically opposed locations from the spherical wall 93. In this instance, the weighted cylindrical object 85 may be either transparent or opaque, but in general will be opaque since weighting of the ball requires that the cylindrical object 85 have a higher specific gravity than the ball, often requiring that the cylindrical insert 85 be metallic.

Figure 6:
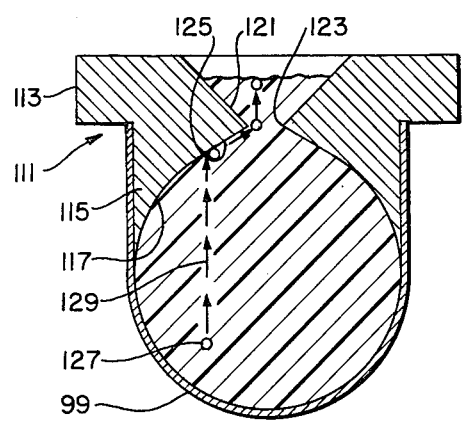
FIG. 6 is a sectional view of the mold of FIG. 5 showing a step in the process of molding the spherical ball.
Figure 5:
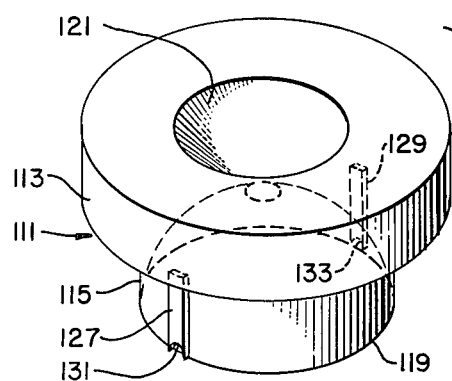
FIG. 5 is a perspective exploded view, partially cut away, showing the final mold section used for surrounding the spider insert of FIG. 2 with a spherical transparent ball.

Referring now to FIGS. 5 and 6, the final mold used for surrounding the spider-encapsulated object 47 of FIG. 2 and for placing the cube 15 thereof at the geometric center of a pool ball will be described. The mold includes a lower section 99 formed as a relatively thin-walled cylinder, open at one end closed at the bottom end by a hemispherical portion having a diameter identical to the cylindrical wall portion. The inside wall of this lower mold portion 99 is preferably highly polished to produce a smooth surface on the ball formed therein and to assist in removing the ball from the mold 99. A pair of grooves 101 and 103 are formed at diametrically opposed positions on the inside of the cylindrical wall portion of the mold 99 and extend from the open end of the mold to a position which is precisely located at the interface between the cylindrical wall portion and the hemispherical wall portion. The lower end 105,107 of the grooves 101,103 is semi-circular in shape, the center of the semi-circles being precisely located at diametrically opposed positions of the hemispherical portion of the mold 99. The diameter of the circular ends 105,107 as well as the width of the grooves 101,103 is substantially identical to the diameter of the spider extensions 51 and 53 of the spider insert 47.

If the spider insert 47 includes plural spider extensions in multiple directions in addition to the arms 51 and 53, the grooves 101 and 103 may be eliminated, assuming that sufficient arms are provided to accurately position the spider member 47 so that the center gravity of the weighted object 109 is precisely located at the geometric center of the ball formed in the mold of FIG. 5. The grooves 101 and 103 permit such precise centering using only the pair of arms 51 and 53. The spider member 47 is inserted into the lower mold half 99 by sliding the ends of the arms 51 and 53 along the grooves 101 and 103 to a position at the bottom of the grooves, with the ends of the arms 51,53 resting on the semi-circular ends 105,107 of the grooves 101,103.

The upper half 111 of the mold of FIG. 5 is substantially T-shaped in outer sectional configuration, as shown in FIG. 6. This T-shaped section is formed by a large diameter, disk-shaped portion 113 and a smaller external diameter disk-shaped portion 115. The outer diameter of the disk-shaped portion 115 is substantially equal to the inner diameter of the cylindrical wall portion of the lower mold 99 so that, as shown in FIG. 6, the upper mold portion 111 may be slid into the lower mold portion 99 with the larger diameter disk-shaped portion 113 abutting the open end of the lower mold 99 to precisely position the molds 99 and 113 relative to one another.

The lower disk-shaped portion 115 includes a hemispherical recess 117 having a diameter equal to that of the hemispherical end of the lower mold 99. Since both the outer cylindrical wall and the inner hemispherical recess 117 of the portion 115 having identical diameters, these wall sections meet at a relatively sharp circular edge 119 forming the bottom of the mold portion 111. The larger diameter disk-shaped portion 113 includes a frustoconical upper recess 121 communicating through a relatively small circular opening 123 with the hemispherical recess 117. At a location adjacent the circular opening 123, the hemispherical recess 117 is advantageously contoured to form a short, frustoconical section 125 to permit the easy escape of entrapped air bubbles from the mold which would not be possible if the entire inner surface of the mold 111 were hemispherical in shape.

A pair of elongate ridges 127 and 129 extend from the smaller diameter portion 115 of the mold 111 and are sized to fit precisely within the grooves 101 and 103 of the mold 99. These ridges 127,129 include semi-circular lower extremities 131 and 133, respectively, having diameters equal to the diameter of the arms 51 and 53, so that, when the mold 111 is positioned within the mold 99, the ridges 127 and 129 fill the grooves 101 and 103 and the lower extremities 131 and 133 conform to the upper surface of the arms 51 and 53 to hold the arms 51 and 53 tightly within the cylindrical cavities formed by the surfaces 105, 107, 131, and 133.

FIG. 6 shows the mold form of FIG. 5 with the spider element 47 removed for ease of illustration. In using the mold of FIG. 6, polyester resin, as described previously in reference to the filling of the mold of FIG. 1, is first slowly poured into the lower mold portion 99 before insertion of the mold portion 111, preferably by slowly pouring the resin into the mold 99 with the mold 99 inclined so that the resin may slowly run down a side wall of the mold 99 to avoid the encapsulation of bubbles in the resin. Preferably the insert 47 is placed in the mold 99 before any resin is injected. The resin is filled to a level in the mold 99 which is sufficient, when the entire mold is complete, to fill the entire spherical cavity formed by the walls of both the mold 99 and the mold 111. After the polyester resin is in place, the upper mold portion 111 is slid into position in the mold 99, displacing resin along the hemispherical wall 117 of the mold 111, through the circular opening 123, and into the frustoconical opening 121. This insertion of the mold portion 111 after the polyester resin has been placed in the mold form 99 eliminates the formation of bubbles as would occur if polyester resin were injected or poured into the completed mold form as shown in FIG. 6, and this process forms an important part of this invention.

As shown by the bubble 127 of FIG. 6, the frustoconical wall portion 125 extending from the hemispherical wall 117 permits the bubble 127 to travel along the path shown at 129 to exit from the spherical mold form into the frustonconical portion 121 of the mold quite readily, so that any bubbles ultimately entrapped within the mold will escape before the polyester resin cures.

The enlarged diameter disk portion 113 of the mold 111 facilitates removal of the ball from the mold of FIG. 5 by jarring the portion 113 of the mold 111 to simultaneously fracture the molded element at the circular opening 123 while removing the upper mold portion 111 from the lower mold portion 99. By then inverting the mold 99 and jarring it against a flat surface, the spherical ball may be broken away from the mold portion 99.

Figure 7:
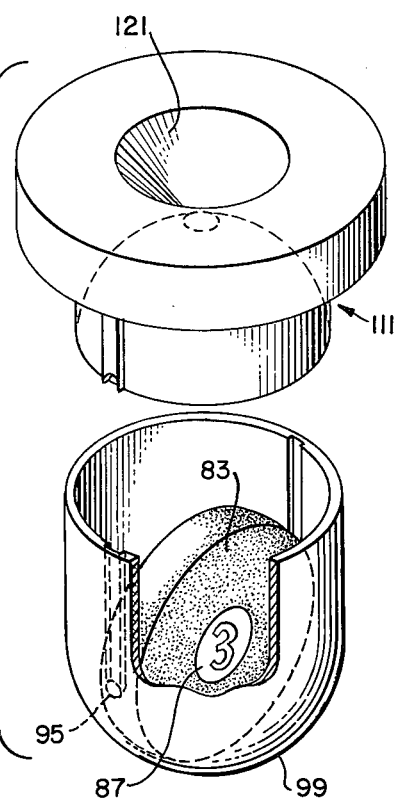
FIG. 7 is an exploded sectional view similar to the view of FIG. 5 showing the two pieces of the final mold structure as used for encapsulating the disk-shaped insert of FIG. 4 in a spherical ball or element.

FIG. 7 shows the mold portions 99 and 111, identical to the mold forms of FIG. 5, used to surround the disk-shaped member 83 of FIG. 4 for forming a spherical ball around this member. Again, as with the embodiment of FIG. 5, the lower mold form 99 is initially filled with polyester resin to a height which is sufficient so that, when the mold portion 111 is inserted in the mold portion 99, the polyester resin within the mold 99 will be displaced to flow into the frustoconical exit cavity 121. With either of the inserts shown in FIGS. 5 and 7, the final mold 99, 111 forms a spherical transparent polyester member surrounding the opaque object 109,87, free of bubbles and quite dramatic in its appearance. The entire ball is preferably transparent, with the opaque object 109,87 clearly visible at the center of the ball. The only interruption in the outer spherical surface of the ball are the two short, diametrically opposed extensions at the end of the arms 51,53 or the extensions 95,97 in the embodiment of FIG. 7, which are easily ground from the surface of the ball. It will be understood that the length of the arms 51 and 53 will be sufficient to fit tightly into the grooves 101 and 103 of the mold of FIG. 5 and that a similar practice is used in the mold of FIG. 7. If the grooves 101 and 103 are eliminated, the length of the arms 51 and 53 will be somewhat shorter to fit tightly within the spherical cavity.

If desired, the disk-shaped element 83 of the embodiment of FIG. 7 may be formed of polyester resin including pigment so that a disk-shaped, colored member is formed in a plane across the center of the ball.

Figure 8:
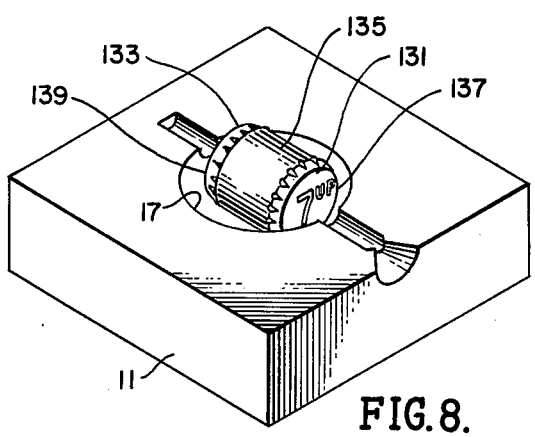
FIG. 8 illustrates an alternate usage for the mold of FIG. 1.
Figure 9:
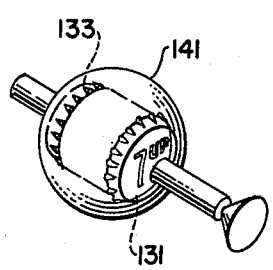
FIG. 9 shows the resulting spider insert produced by the use of the mold of FIG. 1 for the article of FIG. 8.

Referring now to FIGS. 8 and 9, it will be seen that the molding process of the present invention may be used, for example, to encapsulate various objects within the center of a transparent pool ball. In the example of FIGS. 8 and 9, a pair of bottle caps 131 and 133 are first cemented to opposite ends of a cylindrical weighted member 135, the entire assembly formed so that the circular edges 137 and 139 of the caps 131 and 133 precisely conform to the spherical wall 17 of the mold form 11. The mold form 11 is identical to that of FIG. 1 and a second mold form 13 is used to complete the mold. The weighted object 135 may be transparent or opaque, but is generally metallic to provide weighting for the pool ball. FIG. 9 shows the spider insert 141 formed by this molding process, which insert 141 may then be used in the mold of FIG. 5 to produce a transparent pool ball with a pair of bottle caps 131 and 133 positioned adjacent the center and clearly visible through the ball. The embodiment of FIGS. 8 and 9 provides an attractive advertising medium when various objects are placed at the center of the ball.

Figure 10:
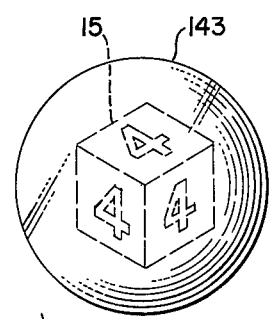
FIG. 10 is a perspective view showing three alternate transparent balls formed by the process and apparatus of FIGS. 1 through 9.
Figure 10:
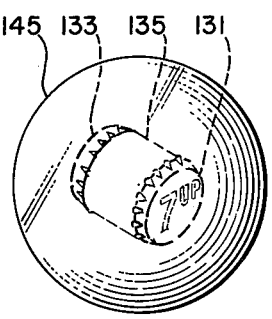
Figure 10:
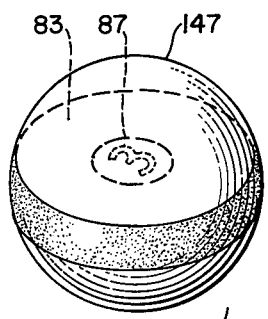

FIG. 10 illustrates the completed ball formed by the apparatus and method previously described. In this instance, three balls, 143, 145, and 147 are displayed, the ball 143 being transparent and including an opaque cube 15 such as that described in reference to FIG. 1. The ball 145 includes the bottle caps 131 and 133 and weighted cylinder 135 described in reference to FIGS. 8 and 9. The ball 147 includes the colored disk 83 and weighted cylindrical member 87, both included within a transparent spherical member, as described in reference to FIG. 7. In each instance, the center of gravity of the included weighted object is located precisely at the geometric center of the spherical balls 143, 145 and 147 through the spider or disk insertion method previously described.

Figure 11:
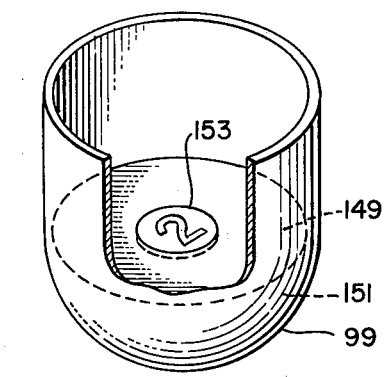
FIG. 11 shows an alternate form of the transparent ball of the present invention and the use of a mold for forming this alternate ball structure.

Referring now to FIG. 11, an alternate molding method will be described. In this instance, the mold form 99 of FIG. 5 is first filled with transparent polyester resin to a level 149 which is precisely at the junction of the cylindrical and hemispherical wall portions of the mold form 99. The polyester resin 151 may then be permitted to partially or totally cure, and a weighted object 153 may be precisely placed at the center of the upper surface 149 of the polyester resin 151. The upper half 111 of the mold of FIG. 5 may then be placed in the mold 99 and the remaining half of the spherical ball may be molded over the polyester resin 151 to adhere to the surface 149, completing a transparent cylindrical ball with the weighted object 153 precisely located at its center.

Balls which have been produced by the process and using the material disclosed in this application are extremely durable and have shown little or no wear after 20,000 impact cycles, which is the equivalent of 5 years of normal use. The balls, after removal from the mold 99,111, may be ground to provide a perfectly smooth spherical surface, the grinding process preferably being selected to uniformly grind the entire outer surface of the ball so that the precise centering of the weighted object will not be altered. This process is, of course, enhanced by providing as smooth an outer surface as possible from the mold forms themselves. The high modulus of resilience of the material used for this ball results in lively play and the balls produced are extremely visually attractive. The balls' curved surface magnifies both the light and the embedded opaque object resulting in a very impressive ball.

What is claimed is:
1. A pool ball comprising, in combination:
  (a) a cylindrical object having identical numeral designations on its opposite ends;
  (b) a colored disc member surrounding in continuous engagement the complete cylindrical surface of said object resulting in a disc-shaped assembly with said numeral designations on opposite sides of said disc-shaped assembly; and,
  (c) a solid transparent hemispherical member comprised of polyester resin having a uniform imperforate surface completely covering the numeral designation on each of said opposite ends of said cylindrical object and each of the opposite sides of said disc member thereby forming a sphere with said disc-shaped assembly, the geometric center of said sphere coinciding with the center of gravity of said disc-shaped assembly, and the transparency of said hemispherical members rendering visible said colored disc member and said numeral designations.

* * * * *